United States Patent [19]
Rizzo

[11] Patent Number: 5,337,833
[45] Date of Patent: Aug. 16, 1994

[54] MACHINE FOR SMOOTHING GROUND SURFACES

[76] Inventor: Salvatore J. Rizzo, 1051 Pleasant St., Southington, Conn. 06489

[21] Appl. No.: 983,034

[22] Filed: Nov. 30, 1992

[51] Int. Cl.5 .............................................. E01C 19/26
[52] U.S. Cl. .................................. 172/520; 172/527; 404/126
[58] Field of Search ............... 172/520, 527, 539, 107, 172/108; 404/125, 126, 122, 124

[56] References Cited

U.S. PATENT DOCUMENTS

| | | | |
|---|---|---|---|
| 998,498 | 7/1911 | Gordon et al. | 404/122 |
| 2,132,107 | 10/1938 | Hamm | 404/126 |
| 2,532,806 | 12/1950 | Gifford | 404/122 |
| 2,925,759 | 2/1960 | Hillis | 404/122 |
| 3,394,641 | 7/1968 | Steck | 404/122 |
| 3,416,419 | 12/1968 | Kronholm | 404/122 |
| 3,868,194 | 2/1975 | Ferguson et al. | 404/126 |
| 3,947,142 | 3/1976 | Takata et al. | 404/126 |
| 4,040,761 | 8/1977 | Rahn | 404/122 |
| 4,266,884 | 5/1981 | Tuneblom | 404/122 |
| 4,679,962 | 7/1987 | Mihara et al. | 404/126 |

FOREIGN PATENT DOCUMENTS

| | | | |
|---|---|---|---|
| 1759695 | 7/1971 | Fed. Rep. of Germany | 404/125 |
| 1123652 | 8/1968 | United Kingdom | 404/126 |

*Primary Examiner*—Clifford D. Crowder
*Assistant Examiner*—A. Vanatta
*Attorney, Agent, or Firm*—Ira S. Dorman

[57] ABSTRACT

A machine for ironing golf greens employs two large-diameter rollers on opposite sides. Both rollers are hydrostatically driven, and they pivot in opposite directions for steering of the machine; one of them also oscillates.

5 Claims, 4 Drawing Sheets

U.S. Patent    Aug. 16, 1994    Sheet 1 of 4    5,337,833
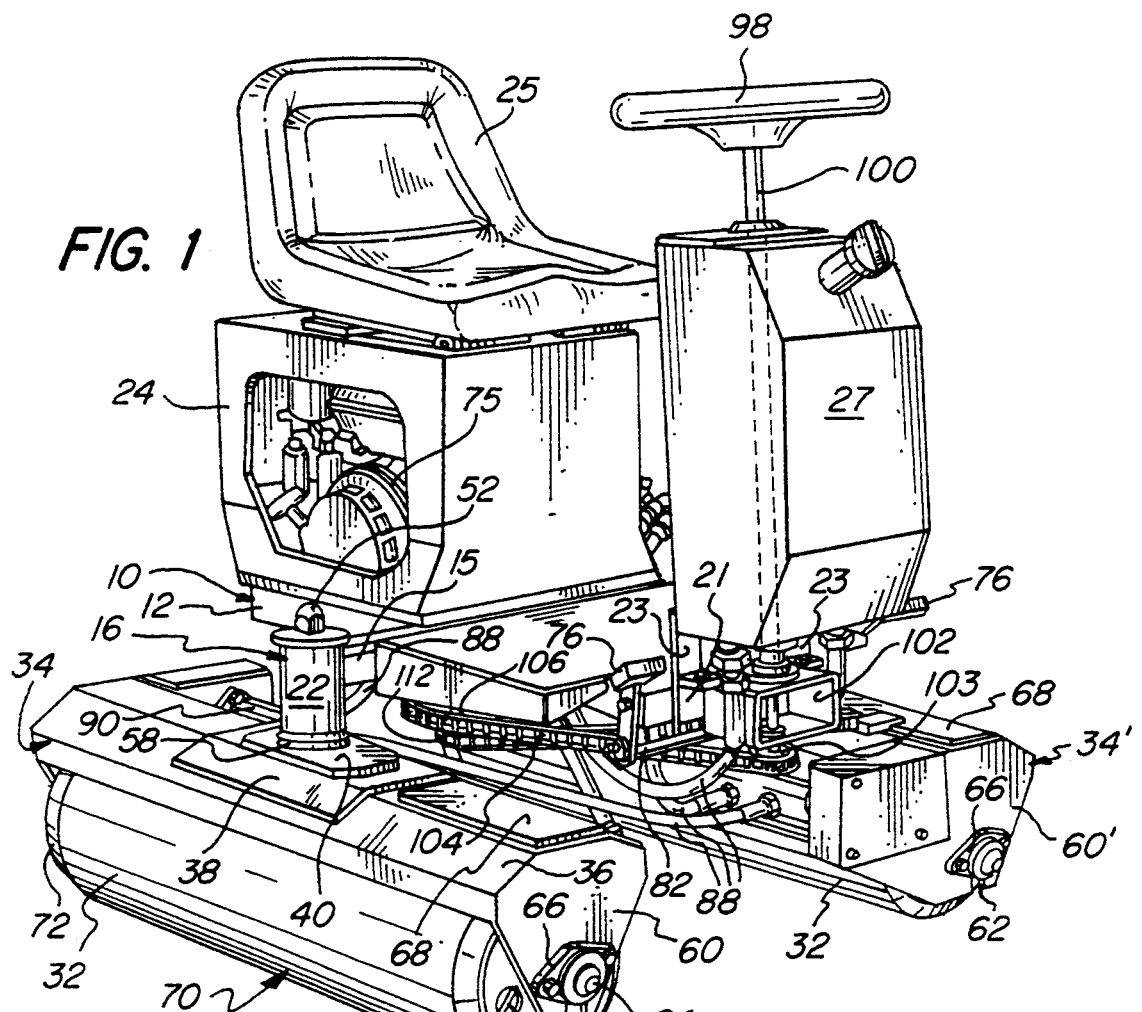
FIG. 1
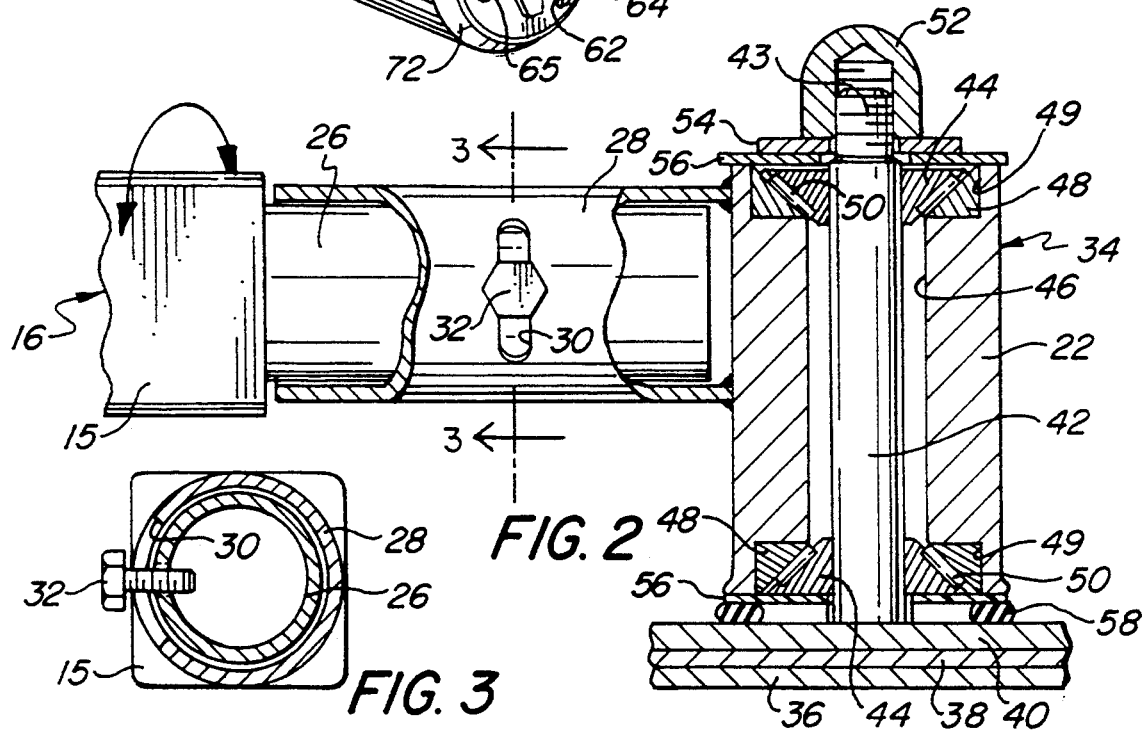
FIG. 2
FIG. 3

MACHINE FOR SMOOTHING GROUND SURFACES

BACKGROUND OF THE INVENTION

This invention relates to machines for smoothing ground surfaces.

Golf course greens are generally rolled or ironed for the purpose of removing footprints, ball-impact marks, and the like. The machines used are designed to function by forcing a redistribution of subsurface soil or sand; it is important that they do so without producing ripples or other distortions, and without undue ground compaction, as would inhibit grass growth. Similar measures are required for maintaining the uniformity and smoothness of clay tennis court surfaces.

A variety of power-driven rolling machines are commercially available, but as far as is known they are not entirely satisfactory for their intended purposes. Not only may the available machines cause excessive compaction and rippling, but generally they also lack adequate speed and maneuverability as well as the ability to closely follow and preserve existing ground contours and undulations.

Accordingly, it is the broad object of the present invention to provide a novel, power-driven machine that functions to smooth ground surfaces without causing undue compaction or rippling.

More specific objects of the invention are to provide such a machine which is fast, highly maneuverable, and capable of closely following and preserving existing ground contours and undulations, which is especially suited for ironing golf course greens, and which is, in addition, facile to use and of relatively incomplex design and economic manufacture.

SUMMARY OF THE INVENTION

It has now been found that the foregoing and related objects of the invention are attained by the provision of a machine comprising a chassis, smoothing means consisting of two cylindrical rollers, each at least eight inches in diameter, mounting means for the rollers, and drive means and steering means for the machine. The rollers are mounted in laterally spaced positions for rotation about their longitudinal axes in generally horizontal, normal orientations, and for pivotal articulation about normally vertical axes; one of them is also mounted for oscillation about a normally horizontal axis, generally perpendicular to the longitudinal and vertical axes thereof. The drive means is operatively connected for effecting simultaneously driven rotation of both rollers at selectively variable speeds, and the steering means is operatively connected for effecting simultaneous articulation of both rollers in opposite directions about the vertical axes defined.

The rollers will preferably be hollow and of the same diameter, and will have outwardly tapered, frustoconical end portions to prevent furrowing or marring of the surface. The mounting means may include an elongate crosspiece affixed on the chassis, one end portion of which has an outermost cylindrical section that is telescopically and rotatably interengaged with a mating cylindrical section on associated supporting means; similar supporting means is rigidly affixed to the opposite end of the crosspiece. The drive means will usually comprise an hydrostatic system to enable operation at speeds that vary continuously between full forward and full reverse limits.

BRIEF DESCRIPTION OF THE DRAWINGS

FIG. 1 is a perspective view of a machine embodying the present invention;

FIG. 2 is a fragmentary rear view, in partial section, of roller-mounting means utilized in the machine of FIG. 1, drawn to a greatly enlarged scale and with portions broken away to show internal features;

FIG. 3 is a sectional view along line 3—3 of FIG. 2;

DETAILED DESCRIPTION OF THE ILLUSTRATED EMBODIMENT

Figures 4, 5:
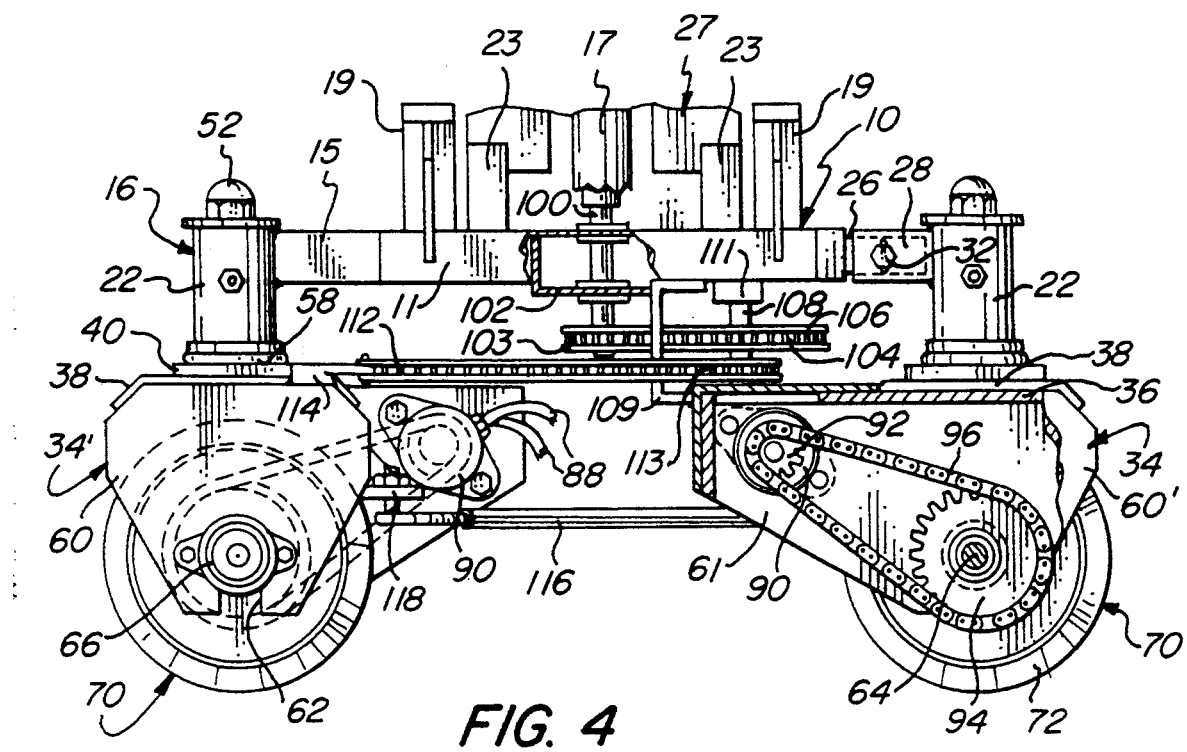
FIG. 4 is a fragmentary rear view of the machine of FIG. 1, with portions broken away to show internal features.
FIG. 5 is a fragmentary side elevational view of the machine, with portions broken away to show internal features.
Figure 6:
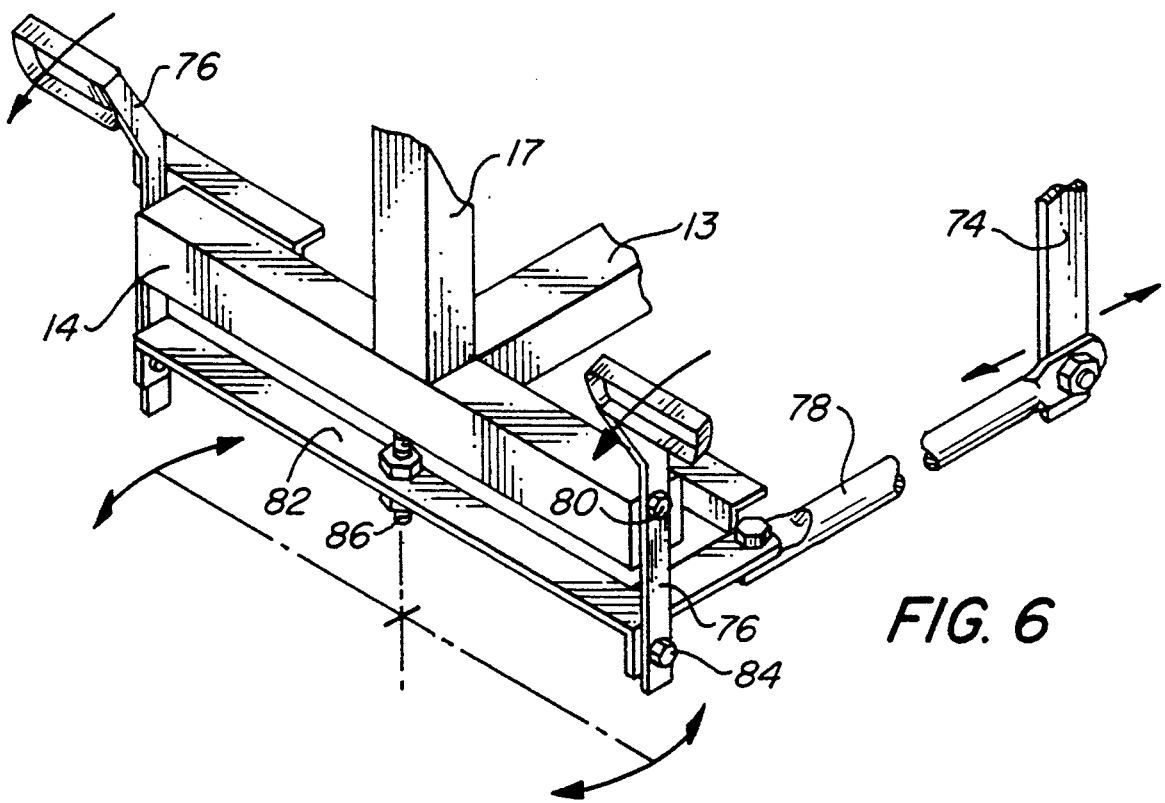
FIG. 6 is a fragmentary perspective view showing the mechanism for controlling the pump of the hydrostatic system used in the machine, together with supporting frame portions.

As illustrated in the appended drawings, the machine of the invention includes a frame, generally designated by the numeral 10, which consists of a rearward member 11, two parallel side members 12, an intermediate cross member 15 (integrated into a mounting assembly, generally designated by the numeral 16), a forward member 14, a perpendicular central member 13, and an upstanding member 17 (mutually perpendicular to members 13 and 14). A pair of reinforced brackets 19 project obliquely upwardly from the rear member 11, and serve to hingedly support the motor-enclosing housing 24, on which is in turn mounted a driver's seat 25. Two right-angle brackets 21 are affixed against the front of the forward member 14, to the opposite sides of the upright member 17, and a corresponding pair of inverted right-angle members 23 are attached thereto and support a reservoir enclosure, generally designated by the numeral 27.

An axially extending cylindrical end portion 26 of the cross member 15 is telescopically received within the passage of a cylindrical sleeve 28, which is circumferentially slotted at 30 to accommodate a limit screw 32 engaged in the end portion 26. The sleeve 28 is attached to the body 22 of a bearing mount, which is thereby rendered rotatable relative to the cross member 15, about a normally horizontal axis and through an arc constrained by the slot 30. The body 22 of an identical bearing mount is rigidly affixed to the opposite end of the member 15.

Roller supports, generally designated by the numerals 34, 34', are laterally disposed on the machine and consist of an elongate housing with a top portion 36 attached to the corresponding bearing mount through a superimposed angle plate 38 and a pin-mounting plate 40. A pin 42 projects upwardly from the plate 40, and extends through the passage 46 in the corresponding bearing body 22 and through upper and lower bearing sets, comprised of elements 44, 48, 50, at the opposite ends thereof, the elements 48 being seated within annular body recesses 49. A cap nut 52 is threadably engaged upon the upper end 43 of the pin 42, securing the assembly with interposed washers 54, sealing elements 56, and 0-rings 58.

Thus, both of the roller supports 34, 34' are pivotably mounted, for articulation about normally vertical axes, on the ends of the cross member 15. In addition however, the support 34 (depicted in FIG. 2 and disposed on the left of the machine, as viewed in FIG. 1) is also oscillatable about a normally horizontal axis.

The housing of each roller support includes flange portions 60, 60', which depend from the opposite ends of the top portion 36 and are upwardly slotted at 62. The rollers, generally designated by the numeral 70, are substantially identical; each consists of a hollow cylindrical body portion 32 having narrow frustoconical portions 72 at its opposite ends. An axle 64 extends through the roller body on its longitudinal axis, and is journalled at its opposite ends by bearing assemblies 66 received in the slots 62. A plug 65 closes an access opening into the roller body, through which water can be introduced for added weight, and a step plate 68 is attached on the top portion 36 of the housing to provide traction for safer entry to the driver's position, as well as to prevent excessive wear.

Power for the machine is provided by an internal combustion engine 75, and is delivered through an hydrostatic system that includes two hydraulic motors 90, one mounted on the internal panel 61 of each roller support 34, 34'. Hydraulic fluid circulates from the pump 73 and reservoir 91 through lines 88 to the motors 90. The reservoir 91 is contained within the enclosure 27, and fluid may be added thereto through the capped fill tube 77.

Figure 7:
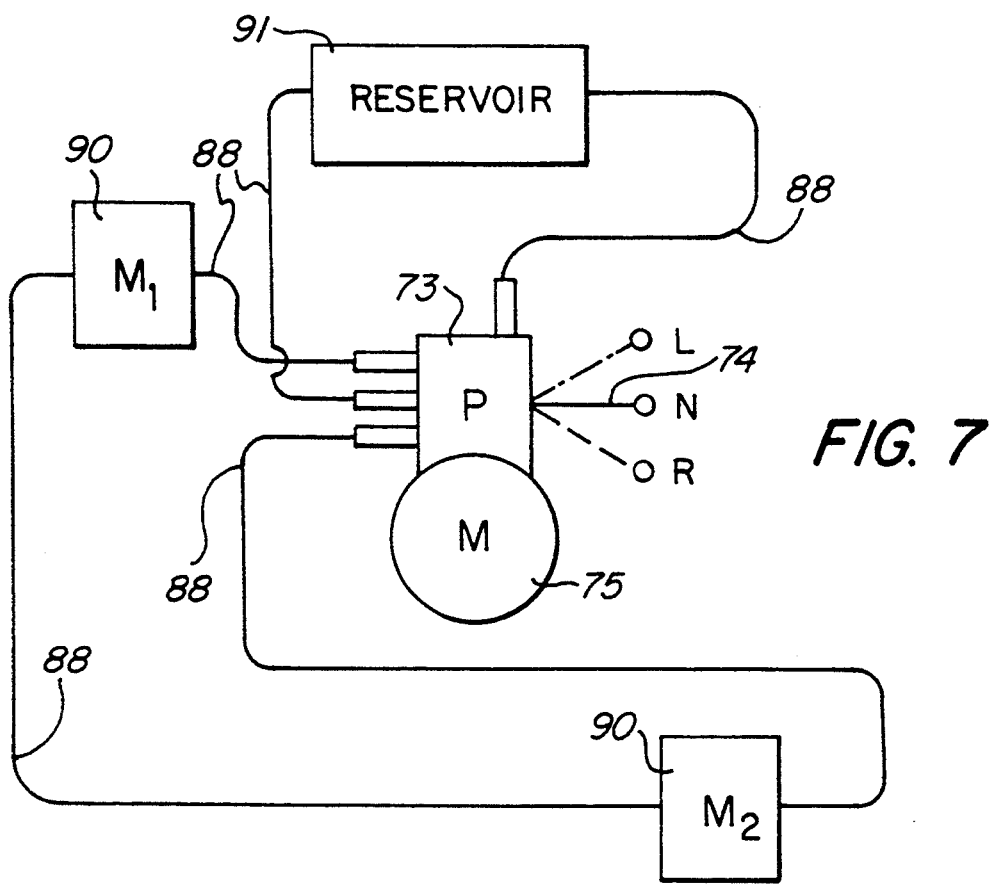
FIG. 7 is a schematic diagram illustrating the hydrostatic power and drive system.

Speed and direction of movement of the machine is controlled by the counter-acting foot pedals 76, which are pivotably mounted by bolts 80 at the opposite ends of the forward cross member 14. An L-shaped bracket 82 is pivotally attached by bolts 84 to the lower ends of the shanks of both pedals 76, at locations remote from the contact pads thereof, and is itself pivotally mounted by a bolt 86, centrally located on the cross member 14 and received through an aperture (not visible) centrally disposed in the longer leg of the bracket. The shorter leg of the bracket is bolted to a link 78, which is in turn pivotably connected to the pump-operating lever 74. As suggested in FIG. 7, movement of the lever 74 from the neutral position "N", to either the left position "L" or the right position "R" will cause the motors 90 to rotate in the corresponding direction; motor speed will of course be proportionate to the degree of angular displacement from the neutral position. The rollers 70 are independently driven by the associated motors 90, acting through a motor pinion 92, a sprocket 94 on the roller axle 64, and a chain 96.

The steering wheel, generally designated by the numeral 98, includes a column 100 that extends through the enclosure 27 and is rotatably supported therebelow in a box-like structure 102 on the front of the cross member 14. A pinion 103 on the lower end of the column 100 is operatively connected through an endless chain 104 to a large gear 106, affixed on a vertical shaft 108 which is in turn supported at its opposite ends by a bracket 109 and a bearing mount 111. The shaft 108 carries a second, smaller gear 113, which is also affixed thereto and is operatively connected to the non-oscillating roller support 34' through a length of chain 112, the opposite ends of which are attached to brackets 114.

The oscillating support 34 is operatively connected to support 34' by a rigid linkage 116, which is attached to flanges 118 and takes the form of a turnbuckle, thus permitting manual adjustment of the relative orientation of the rollers 70.

Figure 8:
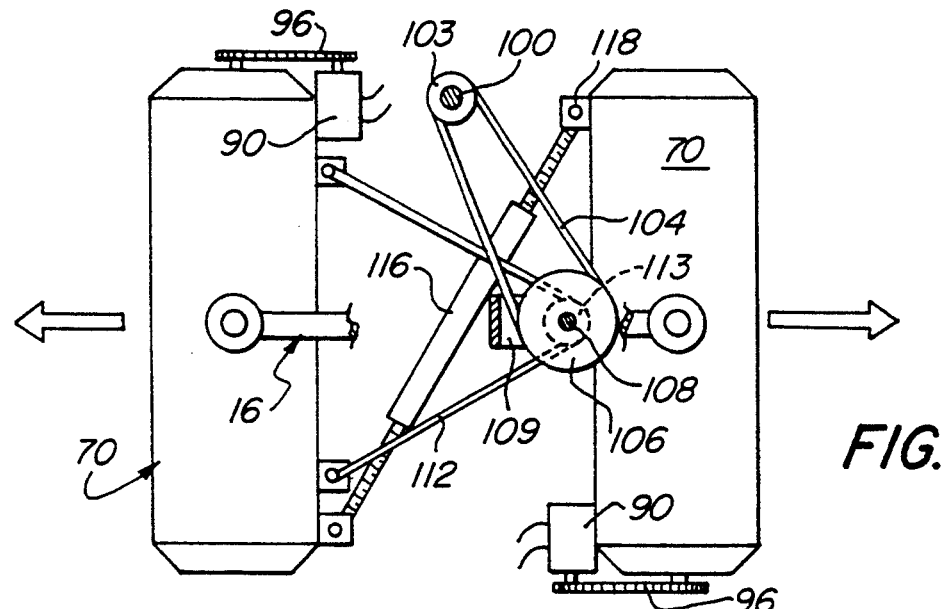
FIGS. 8, 9 and 10 are schematic diagrams showing positions of the rollers and associated components during straight operation, and in turning maneuvers.
Figure 9:
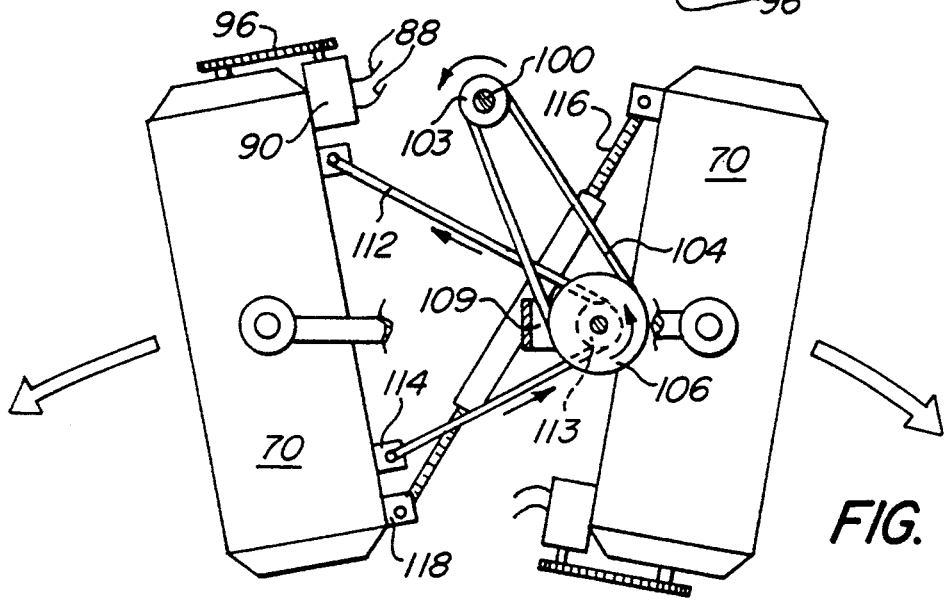
Figure 10:
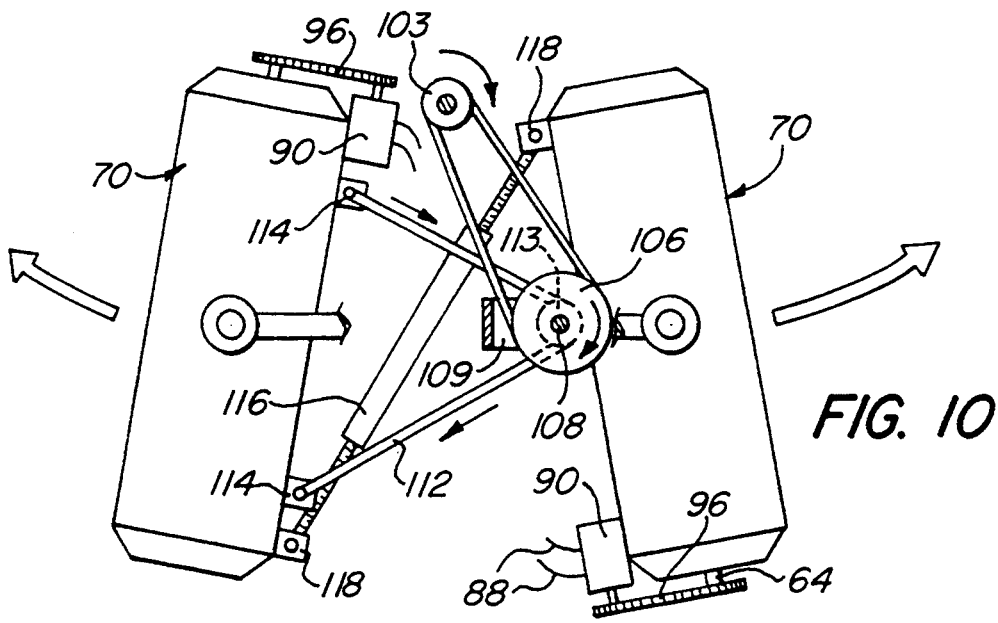

As shown in FIGS. 8 through 10, the steering system described effects articulation of both rollers simultaneously, pivoting them in opposite directions about their vertical axes. This produces a small turning radius, and thereby enables the machine to follow tight curves. Coupled with the freedom that one of the rollers has to oscillate about a horizontal axis, the machine can readily negotiate the complex and undulating contours of a golf course green, faithfully and without alteration thereof.

The avoidance of compaction and rippling is attributable primarily to the use of comparatively large rollers (i.e., of at least about eight inches in diameter), which serve of course to distribute the weight of the machine over a relatively large contact area. In contrast, prior art machines designed for the same purpose typically employ a single, relatively large roller (e.g., of five-inch diameter) on one side, and two smaller rollers (e.g., of three-inch diameter) on the other side, with only the larger roller being driven and the pair of smaller rollers being used for steering.

It will be appreciated that substantial modifications may be made to the machine illustrated and described hereinabove, without departure from the novel concepts of the invention. For example, it may advantageously be fitted with roller scrappers, for returning top-dressing materials to a green and thereby avoiding accumulations that would cause undesirable bouncing, and an arrangement of brushes or the like may be provided for restoring a natural texture to the grass. Finally, although the machine illustrated is particularly adapted for maintenance of golf greens, it has been used as well with outstanding success for smoothing surfaces of clay tennis courts; other applications may also exist, as will occur to those skilled in the art.

Thus, it can be seen that the present invention provides a highly maneuverable, power-driven rolling machine which is adapted for ironing of golf course greens or the like without undue compaction or rippling of the surface, at high speeds, and while closely following and preserving existing contours and undulations. The machine is facile to use, and is of relatively incomplex design and inexpensive manufacture.

Having thus described the invention, what is claimed is:

1. A machine for smoothing ground surfaces without undue compaction, comprising:

a chassis;

smoothing means consisting of two rollers, both of said rollers being of cylindrical form and at least about eight inches in diameter;

mounting means for mounting said rollers in laterally spaced positions on said chassis, substantially symmetric with respect to an axis of symmetry centrally located on said chassis and extending parallel to the longitudinal axes of said rollers, said rollers being mounted for rotation about their longitudinal axes in generally horizontal, normal orientations, and for pivotal articulation about normally vertical axes, said mounting means also enabling oscillation of one of said rollers about a normally horizontal axis generally perpendicular to said longitudinal and vertical axes thereof;

a driver's seat so mounted on top of said chassis as to afford a seated driver a substantially unobstructed view along the entire length of both of said rollers;

drive means on said chassis, comprising an hydrostatic system, operatively connected for effecting simultaneously driven rotation of both of said rollers, at selectively variable speeds, said hydrostatic system including a reservoir for hydraulic fluid mounted on top of said chassis; and steering means on said chassis operatively connected for effecting simultaneous pivoting of both of said rollers in opposite directions about said vertical axes, said driver's seat, steering wheel, and reservoir being disposed substantially on said axis of symmetry for optimal weight distribution and driver's visibility.

2. The machine of claim 1 wherein said rollers are both of the same diameter.

3. The machine of claim 2 wherein said rollers are hollow, and have opposite ends with outwardly tapered frustoconical portions at the opposite ends thereof.

4. The machine of claim 1 wherein said mounting means includes an elongate crosspiece affixed on said chassis, and supporting means for said rollers on opposite end portions of said crosspiece, one of said end portions of said crosspiece having an outermost cylindrical section, and said supporting means associated therewith supporting said one roller and having a mating cylindrical section thereon telescopically interengaged with said outermost section and rotatable relative thereto, the other of said supporting means being rigidly affixed to the other of said end portions of said crosspiece.

5. The machine of claim 1 wherein said hydrostatic system is capable of speeds continuously variable between full forward and full reverse limits.

* * * * *